US011539999B2

(12) United States Patent
Poli et al.

(10) Patent No.: US 11,539,999 B2
(45) Date of Patent: Dec. 27, 2022

(54) SESSION CONTROL OF BROADCAST VIDEO SERVICES FOR DAA AND NON-DAA AUTOMATION

(71) Applicant: ARRIS Enterprises LLC, Suwanee, GA (US)

(72) Inventors: Christopher Poli, Doylestown, PA (US); Steven Moscirella, Phoenixville, PA (US); Robert Mack, Collegeville, PA (US); Roger Gahman, Telford, PA (US); Thomas Doblmaier, North Wales, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 112 days.

(21) Appl. No.: 16/672,631

(22) Filed: Nov. 4, 2019

(65) Prior Publication Data

US 2020/0145710 A1 May 7, 2020

Related U.S. Application Data

(60) Provisional application No. 62/755,900, filed on Nov. 5, 2018.

(51) Int. Cl.
| | |
|---|---|
| *H04N 7/173* | (2011.01) |
| *H04N 21/2665* | (2011.01) |
| *H04N 21/222* | (2011.01) |
| *H04N 21/6405* | (2011.01) |
| *H04N 21/262* | (2011.01) |
| *H04N 21/61* | (2011.01) |

(52) U.S. Cl.
CPC ..... *H04N 21/2665* (2013.01); *H04N 21/2221* (2013.01); *H04N 21/262* (2013.01); *H04N 21/6118* (2013.01); *H04N 21/6405* (2013.01)

(58) Field of Classification Search
CPC .......... H04N 21/2665; H04N 21/2221; H04N 21/262; H04N 21/6405; H04N 21/6118
See application file for complete search history.

(56) References Cited

U.S. PATENT DOCUMENTS

| | | | |
|---|---|---|---|
| 6,252,634 B1 | 6/2001 | Yuen et al. | |
| 10,764,651 B1 * | 9/2020 | Almeida | H04N 21/6168 |
| 2009/0025027 A1 * | 1/2009 | Craner | H04N 21/2385 |
| | | | 725/116 |
| 2009/0031341 A1 * | 1/2009 | Schlack | H04N 21/437 |
| | | | 725/38 |
| 2009/0207866 A1 | 8/2009 | Cholas et al. | |

(Continued)

FOREIGN PATENT DOCUMENTS

WO 2020096998 A1 5/2020

OTHER PUBLICATIONS

European Patent Office; International Search Report and Written Opinion for International App. No. PCT/US2019/059741 dated Apr. 17, 2020; 10 pages.

Data-Over-Cable Service Interface Specifications; DOCSIS 3.1; Cable Modem Operations Support System Interface Specification; CM-SP-CM-OSSIv3.1-I16-190917; pp. 1-304.

(Continued)

*Primary Examiner* — Gigi L Dubasky
(74) *Attorney, Agent, or Firm* — Chernoff, Vilhauer, McClung & Stenzel, LLP

(57) ABSTRACT

The system may include a headend and/or a hub that includes a processor that provides signals to consumer premises devices. The headend and/or the hub is configured with a headend configuration table defining broadcast video services for a desired distribution of broadcast video services, where configurating the headend configuration table is performed based upon data from a digital video configuration service that is independent of the broadcast video services.

15 Claims, 8 Drawing Sheets

(56) References Cited

U.S. PATENT DOCUMENTS

| | | | |
|---|---|---|---|
| 2011/0277008 A1* | 11/2011 | Smith | H04N 21/26291 725/116 |
| 2013/0101071 A1 | 4/2013 | Salinger | |
| 2014/0177463 A1* | 6/2014 | Salinger | H04N 19/80 370/252 |
| 2015/0026724 A1* | 1/2015 | Alder | H04N 21/47 725/40 |
| 2016/0269764 A1 | 9/2016 | Lajoie | |
| 2018/0160191 A1* | 6/2018 | Mahadevan | H04N 21/482 |
| 2018/0288369 A1 | 10/2018 | Gaebel, Jr. et al. | |
| 2020/0076469 A1* | 3/2020 | Ariesen | H04H 20/78 |
| 2020/0145710 A1 | 5/2020 | Poli | |

OTHER PUBLICATIONS

Data-Over-Cable Service Interface Specifications; DOCSIS 3.1; CCAP Operations Support System Interface Specification; CM-SP-CCAP-OSSIv3.1-I15-190422; pp. 1-661.

Data-Over-Cable Service Interface Specifications; DCA—Remote MACPHY; Remote MAC-PHY Technical Report; CM-TR-R-MACPHY-V01-150730; pp. 1-54.

Society of Cable Telecommunications Engineers; Engineering Committee—Digital Video Subcommittee; SCTE Standard, SCTE 40 2016, Digital Cable Network Interface Standard; 2016; pp. 1-31.

European Telecommunications Standards Institute; Digital Video Broadcasting (DVB); Specification for Service Information (SI) in DVB Systems; EN 300 468 V1.3.1; Feb. 1998; pp. 1-74; European Telecommunications Standards Institute, Valbonne, France.

Data-Over-Cable Service Interface Specifications; DOCSIS 3.1; Security Specifications; CM-SP-SECv3.1-I08-190917; pp. 1-190.

Data-Over-Cable Service Interface Specifications; DOCSis 3.1; Physical Layer Specification; CM-SP-PHYv3.1-1I16-190121; pp. 1-296.

Data-Over-Cable Service Interface Specifications; DOCSIS 3.1; MAC and Upper Layer Protocols Interface Specification; CM-SP-MULPIv3.1-lI19-191016; pp. 1-860.

\* cited by examiner

Network Information Table

| Syntax | No. of bits | Identifier |
|---|---|---|
| network_information_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   network_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   network_descriptors_length | 12 | uimsbf |
|   for(i=0;i<N;i++){ | | |
|     descriptor() | | |
|   } | | |
|   reserved_future_use | 4 | bslbf |
|   transport_stream_loop_length | 12 | uimsbf |
|   for(i=0;i<N;i++){ | | |
|     transport_stream_id | 16 | uimsbf |
|     original_network_id | 16 | uimsbf |
|     reserved_future_use | 4 | bslbf |
|     transport_descriptors_length | 12 | uimsbf |
|     for(j=0;j<N;j++){ | | |
|       descriptor() | | |
|     } | | |
|   } | | |
|   CRC_32 | 32 | rpchof |
| } | | |

FIG. 2

Event Information Table

| Syntax | No.of Bits | Identifier |
|---|---|---|
| event_information_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for(i=0;i<N;i++){ | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for(i=0;i<N;i++){ | | |
|       descriptor() | | |
|     } | | |
|   } | | |
|   CRC_32 | 32 | rpchof |
| } | | |

FIG. 3

| Tuning Triplet for QAM Video | | | | |
|---|---|---|---|---|
| Service | MPTS | QAM | DAA Distr | Comments |
| | | | | |
| BCST 1 | A | BA-17 | Global | National/ Off-air |
| BCST 2 | A | BA-17 | Global | National/ Off-air |
| BCST 3 | A | BA-17 | Global | National/ Off-air |
| BCST 4 | B | BA-18 | Global | National/ Off-air |
| BCST 5 | B | BA-18 | Global | National/ Off-air |
| BCST n | C | BA-23 | Global | National/ Off-air |
| | | | | |
| 1-Az | Z1-A | BA-20 | AdZone1 | Ad Zone |
| n-Az | Z1-B | BA-40 | AdZone1 | Ad Zone |
| | | | | |
| PEGx1 | PEGx-A | BA-15 | PEGx | PEG |
| PEGxn | PEGx-A | BA-15 | PEGx | PEG |
| | | | | |
| Sw1 | Switched | BA-158 | NCST X0 | Switched |
| Sw2 | Switched | BA-158 | NCST X0 | Switched |
| Swn | Switched | BA-158 | NCST X0 | Switched |
| | | | | |
| VOD1 | VOD | BA-25 | NCST X0 | VOD QAM |
| VOD2 | VOD | BA-26 | NCST X0 | VOD QAM |
| .... | VOD | BA-27-31 | NCST X0 | VOD QAM |
| VOD8 | VOD | BA-32 | NCST X0 | VOD QAM |

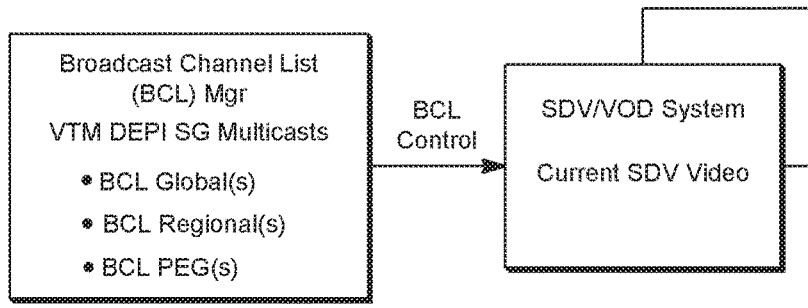

FIG. 6A

SESSION CONTROL OF BROADCAST VIDEO SERVICES FOR DAA AND NON-DAA AUTOMATION

CROSS REFERENCE TO RELATED APPLICATIONS

This application claims the benefit of U.S. Provisional Patent Ser. No. 62/755,900 filed Nov. 5, 2018.

BACKGROUND

The subject matter of this application relates to systems and methods for session control of broadcast video services for cable networks.

Modern CATV delivery systems provide to their customers not only the broadcast television content (video plane) historically associated with cable delivery networks, but also data services (data plane) such as Internet services, video-on-demand, and other data communications either desired or necessary for providing customer services. The evolution of the architectures to deliver these respective video plane and data plane services has traditionally been disconnected, since traditional radio frequency (RF) combiner networks in a headend allowed video and data streams to have a fair degree of independence during delivery of both video and data. However, recent distributed access architectures (DAAs) distribute to a remote location the physical devices (PHY layer) that performs the digital to analog conversion from the control platforms (MAC layer) for those devices, which often remain in the headend. The distributed access architecture introduces difficulties in configuring a legacy video network for video delivery in the distributed access architecture. For example, configuring a remote physical device is challenging because it is not known what video services are connected to a specific remote physical device during deployment. Further, scaling the architecture across multiple remote physical devices is also problematic. For example, the remote physical device configuration needs to be generated manually for each remote physical device.

What is desired, therefore, an automated process of session control for broadcast video services.

BRIEF DESCRIPTION OF THE DRAWINGS

For a better understanding of the invention, and to show how the same may be carried into effect, reference will now be made, by way of example, to the accompanying drawings, in which:

FIG. 2 illustrates a network information table.

FIG. 3 illustrates an event information table.

FIGS. 6A-6C illustrate tuning triplets for each service placed on the frequency spectrum.

DETAILED DESCRIPTION

Distributed access architectures may include R-PHY architectures that relocate physical (PHY) devices downstream into the network while retaining the control layer (MAC) layer in the head end, as well as R-MACPHY architectures that relocate both the PHY and MAC layers downstream into the network and R-OLT architectures that relocate optical line terminals (OLT) in passive optical networks (PON) to a remote location, as well as many other variations. An R-PHY architecture, which remotely locates a physical device (PHY) that converts optical digital signals to radio frequency (RF) signals such as a quadrature amplitude modulated (QAM) signal, will be used to describe the embodiments disclosed in this specification, but those of ordinary skill in the art will appreciate that the disclosures herein may be employed with other DAA architectures and/or remote devices. Exemplary embodiments may include a video configuration for video delivery at various points in a video stream construction. The system may include a management system to facilitate configuration changes to headend distributed access video generation elements and/or remote physical devices.

System Overview

Figure 1:
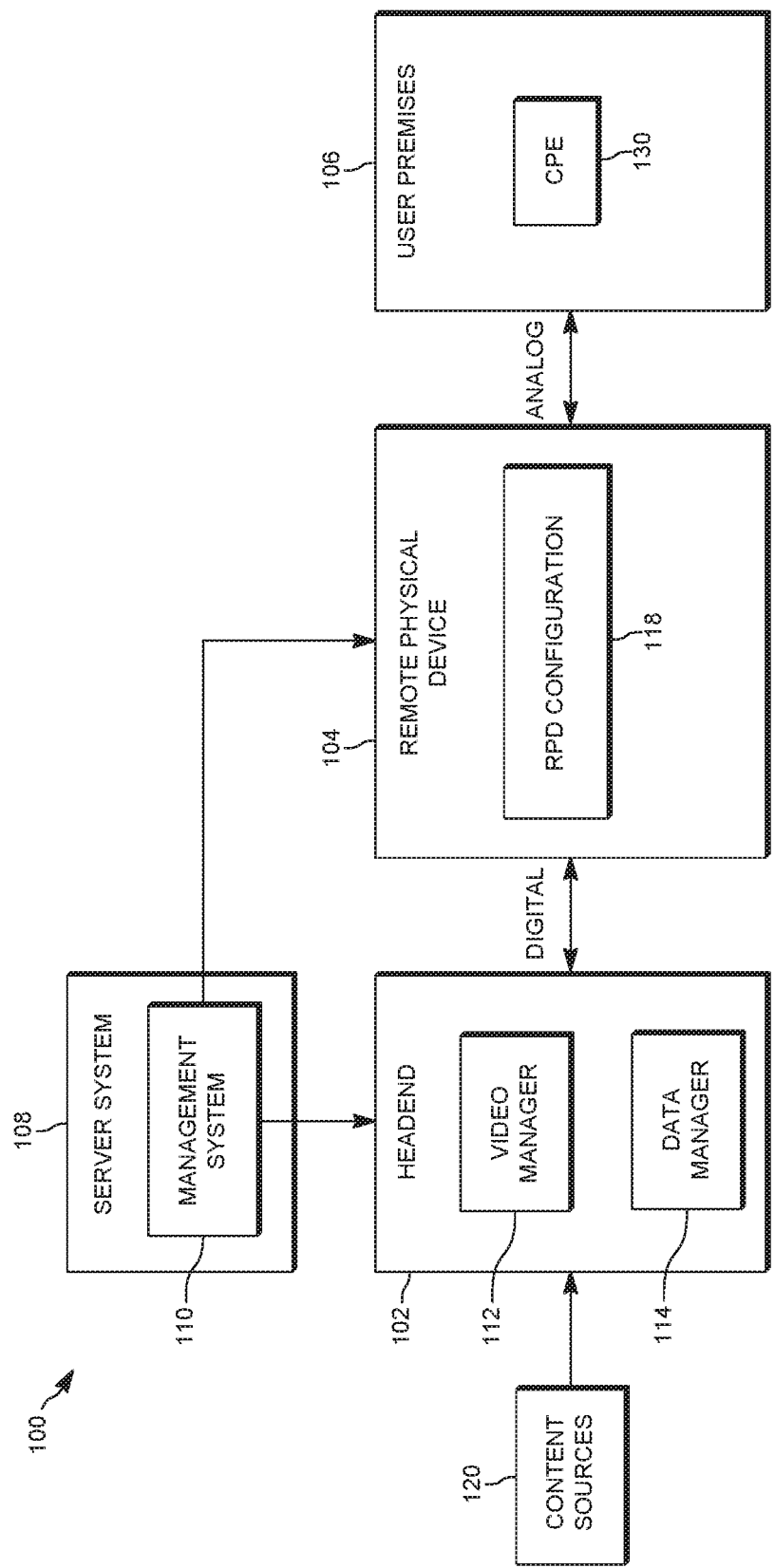
FIG. 1 illustrates an exemplary system for delivering data and video.

FIG. 1 depicts a simplified system 100, simply for purposes of illustration, capable of being used to implement a technique for delivering data and video according to some embodiments. The system 100 includes a headend 102, a remote physical device 104, user premises 106, and a server system 108. The system 100 may be a distributed access architecture as discussed above where digital optical components are used to replace analog optical components between the headend 102 and the remote physical device 104, which allows the physical components to perform the analog to digital (and RF) conversion and to be configured deeper in the network, closer to the user premises 106. The headend 102 may deliver video and data to user premises 106 using the remote physical device 104. Although a single user premises 106 and a single remote physical device 104 are shown, the remote physical device 104 may be coupled to multiple user premises 106. Additionally, the system 100 may include multiple remote physical devices 104 that are coupled to different sets of user premises 106.

The headend 102 may receive video and data from content sources 120. A video manager 112 may manage the video delivery to the user premises 106 and a data manager 114 may manage the data delivery to the user premises 106. In some embodiments, the headend 102 may deliver both video and data to the user premises 106 via the same frequency spectrum. For example, the RF frequency spectrum may include an upstream frequency range and a downstream frequency range. The downstream frequency range may deliver both video and data downstream from the headend 102 to the user premises 106 at different frequencies. Similarly, the upstream frequency range delivers video and data upstream from the user premises 106 to the headend 102. The headend 102 may send the video and data signal via a digital network, such as via an optical signal. The remote physical device 104 may receive the digital signal and convert the signal to analog, such as to an RF signal. In the upstream direction, the remote physical device 104 receives analog video or data signalling from the user premises 106, converts the analog video or data signalling to a digital signal, and sends the digital signal to the headend 102.

The video manager 112 may use an RPD configuration 118 to insert video and data into a digital signal that is sent to the remote physical device 104. The remote physical device 104 then converts the video into analog at the corresponding frequencies and sends the analog signal to the user premises 106.

The RPD configuration 118 may be a list of addresses that pertain to video delivery. For example, the addresses may be multicast addresses for video streams. The video manager 112 uses information that is associated with video streams received at the headend 102 to determine which video to insert into the digital signal that is sent to the remote physical device 104. For example, the headend 102 receives various video streams based on a legacy video delivery through a legacy video network (e.g., a network that creates video streams and performs the QAM RF conversion at the headend 102). The video manager 112 inserts the appropriate video into the digital signal with information about the desired frequency placement for the specific RPD configuration 118 and provides the video to the specific remote physical device 104.

The server system 108 includes a management system 110 that can define the suitable configuration for the video delivery for the headend 102. The management system 110 may also define the suitable configuration of the RPD configuration 118 for the video delivery for the remote physical device 104.

As it may be observed the user premises 106 may include consumer premises equipment (CPE) 130 in the form of cable modems and/or set top boxes and/or television with decrypting card (or otherwise) at the user premises 106. Such consumer premises equipment are distributed across cable systems ranging from thousands of devices to hundreds of thousands of devices to tens of millions of devices to receive and render broadcast video services. In some cases, such consumer premises equipment may be one way receiving devices that are not capable of transmitting data or otherwise to the network. In other cases, such consumer premises equipment may further be capable of transmitting data or otherwise to the network. In yet other cases, such consumer premises equipment may be cable of receiving other types of video streams, such as those suitable for linear broadcasts, conditional access, video on demand, switched digital video, and advertisement insertion.

The headend 102 in combination with the remote physical device 104 are often capable of providing (1) video stream distributions where one or more of the video streams are constructed based on selections by the viewer, in a manner together with, (2) the broadcast of more traditional video streams, such as legacy networks (e.g., ABC, CBS, NBC, CNN, PBS, etc.) where the video streams are not constructed based on selections by the viewer. Both video streams are provided by the headend 102 to the remote physical device 104 and to the user premises as an analog signal on a coaxial cable. Accordingly, the video stream is provided by the headend 102 to the user premises 106 and the CPEs 130. When the viewer selects a channel in a traditional broadcast video stream the consumer premises equipment tunes to the selected channel of the traditional broadcast video stream. In this manner, the headend 102 is capable of providing traditional broadcast video streams to the consumer premises equipment that are not capable of making particular requests. In the event that the consumer premises equipment is capable to making requests to the headend 102 for particular video streams, the requested video stream may be provided to the consumer premises equipment through a coordination of video stream placement and consumer premises equipment tuning by a system, such as a switched digital video system.

The initial configuration of the system, including the headend 102 and the remote physical device 104, to accommodate the distribution of traditional broadcast video streams is complicated, time consuming, and prone to error. The complications may be further aggravated by the available physical space at the headend, power constraints at the headend, and data demands at the headend. Modification of the existing configuration of the system, including the headend 102 and the remote physical device 104, to accommodate the modified distribution of traditional broadcast video streams is increasingly complicated, time consuming, and prone to error. To achieve such modification of the existing configuration, one or more computing devices of the headend, such as one or more servers, needs to be updated to include updated configuration settings, each of which may be different for different portions of the system. For example, this may involve updating a relatively small group of such headend computing devices. To further achieve such modification of the system, each of the respective remote physical devices 104 needs to be updated to include the updated configuration settings, each of which may be different for different portions of the system, and each of which include updated settings that are consistent with the particular updated headend 102 from which it receives video. For example, this may involve updating hundreds of such remote physical devices 104. The management of a particular system among the multitude of different remote physical devices, with varying content services being provided to each of the different remote physical devices, is a burdensome task. Moreover, as the scale of the number of remote node devices increases, the management becomes increasingly more burdensome.

The operator of the cable systems regularly changes their agreements with content providers of the channel lineup which in turn requires updating selected portions of the computing devices of the headend and the corresponding remote physical devices, which often takes weeks to months to achieve. Moreover, the updating of the computing devices of the headend and the corresponding remote physical devices should be performed in a suitable sequence, often during maintenance windows, so that the system remains operational during the modification process.

Many cable systems are being modified to include DOCSIS 3.1 (Data Over Cable Service Interface Specification 3.1), incorporated by reference herein in its entirety, which may require modification of the channel lineup and associated computing devices of the headend along with the corresponding remote physical devices, which may vary based upon different geographic regions served by the cable system, to create room for 32-QAM/192 MHz OFDM block(s) or 96 MHz OFDM half-blocks.

In addition, it is also problematic to properly identify Ad Zones, which may include different geographic regions of the available cable system for local advertisement insertion, that should be applied at a given point within a non-distributed cable system, or at remote physical devices in the case of a distributed cable system.

It is also problematic to identify channel maps, which may vary based upon different geographic regions served by the cable system, which may include, for example, (1) the logical cable channel (e.g., channel 122); (2) physical channel-subchannel of the cable system (e.g., channels 86-122); and (3) the station name (e.g., Fine Living), that should be applied at a given point within a non-distributed cable system, or at the remote physical devices in the case of a distributed cable system.

It is also problematic to identify narrowcast service groups, which may vary based upon different geographic regions served by the cable system, which may include sets of quadrature amplitude modulated signals mapped to channels, that should be applied at a given point within a non-distributed cable system, or at the remote physical devices in the case of a distributed cable system. Narrowcast services refer to video services that are either switched digital video (SDV) or on-demand digital video (VOD). The specific placement of the narrowcast service(s) on a QAM frequency and assignment of service number(s) are subject to the underlying SDV or VOD sub-system. In general, instead of combing all the channels into one programming video stream throughout the network, switched digital video (SDV) only groups together a selection of the most popular channels for a network wide video stream that are not under control of the SDV controller. Less popular channels that are under control of the SDV controller are provided in a video stream to a customer or group of customers only when a customer tunes to that channel. As the popularity of selected channels changes over time, the system switches in the more popular channels and switches out the less popular channels in the network-wide broadcast. The determination of what content is broadcast network-wide and what content is allowed to be switched into a video stream may be based upon the customer usage for geographic regions, selected portions of the distribution network, selected remote physical devices, etc.

It is also problematic to identify "Public, Education and Government" (PEGs) channels, which may vary based upon different geographic regions served by the cable system, which may include different public access channels available for use by the general public in different geographic areas, that should be applied at a given point within a non-distributed cable system, or at remote physical devices in the case of a distributed cable system.

It is also problematic to identify Out of Band Control Channels, which may vary based upon different geographic regions served by the cable system, which is typically a quadrature phase shift keying signal downstream and a radio frequency signal upstream, that should be applied at a given point within a non-distributed cable system, or at the remote physical devices in the case of a distributed cable system.

Moreover, it is problematic to accommodate differences in conditional access controllers, and/or service information, and/or customer premise equipment capabilities in a unified and consistent manner, especially across a different geographic regions.

It is desirable to facilitate modification and scaling of the configuration structures of distributed access architecture (DAA) for the distribution of traditional broadcast video streams. In many cases, the signaling between the headend and the remote physical devices uses a remote downstream external PHY interface as the interface between the headend and the remote physical device. The remote downstream external PHY interface (DEPI) is an Internet protocol pseudowire between the MAC and PHY that contains both a data path for DOCSIS frames, video packets, and OOB packets, as well as a control path for setting up, maintaining, and tearing down sessions. The data path may be DEPI wrapped groups of multi program transport stream (MPTS) video streams distributions to groups of remote physical devices. The multi program transport stream (MPTS) may be a MPEG-2 compliant transport stream that contains more than one video (or audio) program. A single program transport stream (SPTS) may be a MPEG-2 compliant transport stream that contains one video (or audio) programs.

It is also desirable to facilitate modification and scaling of the configuration structures of non-distributed access architecture (non-DAA) for the distribution of traditional broadcast video streams. The non-DAA typically includes radio-frequency combiners for the inputs and outputs of QAM or QPSK modulated signals or in some cases direct Internet protocol.

Some principal perceived limitations in the modification and scaling of the configuration structures of a cable system are the complexity of simultaneously configuring disparate systems and the limitations of the creation of the component multi-program transport stream broadcast video services (which relate to legacy video infrastructure and alignment of channel maps distributed from the customer premises equipment provisioning controller—often also referred to as the conditional access controller) that ultimately form the basis of the broadcast and narrowcast multi-program transport stream video stream distributions. It is noted that switched digital video groups are driven by client tuning (i.e., these are mapped to specific physical quadrature amplitude modulated channels) while broadcast video services are not driven by client tuning. As previously noted, the cable system may include a distributed access architecture that includes R-PHY (i.e., remote PHY), R-MAC PHY (i.e., remote MAC and PHY), R-OLT (i.e., remote optical line terminal), etc., (generally referred to herein as remote physical devices (RPD)) where digital optics are used to replace traditional HFC (i.e., hybrid fiber coaxial) analog optics to the nodes. In other words, downstream external-phy interface (DEPI) wrapped groups of multi-program transport stream (MPTS) video streams distributions to groups of remote physical devices (RPDs).

It is desirable to facilitate modification and scaling of the configuration of a cable system, in a manner suitable for legacy and non-legacy architectures, based upon structures included within the video services. In particular, it is desirable to define the linear broadcast video services and the multi-program transport stream configuration at various points in the video stream construction to facilitate modification and scaling of the configuration of a cable system. Preferably, it is desirable within the video to include suitable packet identifier (PID) insertion and leveraging switched architecture and protocols that are applied to broadcast services to limit the information provided by an operator having a primary function to configure either the legacy video system or the evolved distributed access architecture (DAA). Broadcast services refer to video services that are always present at the viewer's device (traditionally this refers to non-switching services that are carried on the same QAM frequencies and use a MPEG-2 transport stream service number(s) defined in system information/channel maps or network information tables (see FIG. 2)/event information tables (see FIG. 3) (DVB) (see, EN 300 468 v 1.3.1 (1998-02) "Digital Video Broadcasting (DVB); Specification for Service Information (SI) in DVB systems" incorporated by reference herein in its entirety). Channel maps and event information tables of ANSI/SCTE 65, "Service Information Delivered Out-Of-Band For Digital Cable Television" (2016), may likewise be used, incorporated by reference herein in its entirety. The PID may be a unique integer value used to identify elementary streams of a program in a single or a multi-program transport stream, including for example, emergency alert data stream, consumer premise equipment (e.g., set-top boxes, etc.) control streams (e.g., digital transport adapter or digital video broadcast), switched digital video mini-carousel data streams, network or system information data streams, guide data streams, enhanced television binary interchange format data streams, and other data streams.

Figure 4:
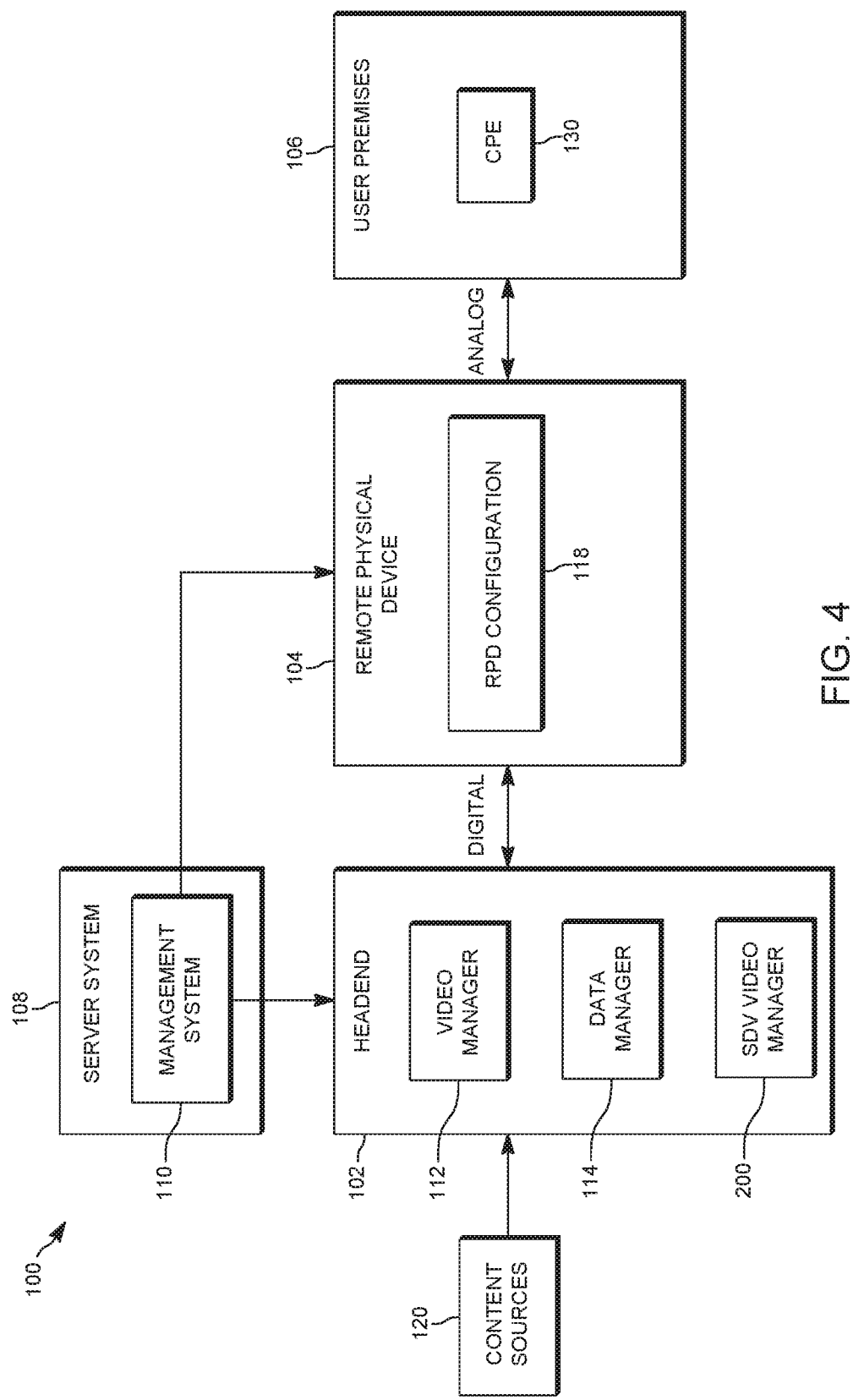
FIG. 4 illustrates a modified system for delivering data and video.

Referring to FIG. 4, the switched architecture, which may include switched digital video (SDV) 200 with the headend 102 that may include an IP unicast or multicast stream containing MPEG-2 transport stream packets which includes a group of components used for the control plane of R6 and/or remote procedure call (RPC) switching control protocols. The switching control protocols included within switched digital video are preferably used to manage the broadcast MPTS in a QAM/non-DAA (no DEPI wrapping) and/or in a (R-PHY with DEPI wrapping) linear broadcast video service. The management preferably includes the configuration information of the computing devices of the headend 102 and the R-PHY nodes. The switching control protocols may be session control that relates to the R6 and RPC control protocols included with switched digital video services. Other protocols may likewise be used depending on the particular video service included. It is counterintuitive to use the switching control protocols of a digital video stream that is used to select video content after a request for such video content is made by the user, to pre-tell the configuration for broadcast services that are a separate video service from the one including the switching control protocols.

Out of Band Control Channel(s) and RF Upstream, if present, may be handled outside of the Session Control of Broadcast Services architecture or be included as a specific out of band (OOB) instance within the distributed access architecture (DAA) context. The out of band (OOB) control channel may provide Conditional Access System or DRM System linkage to the associated channel maps and distribution management coordinated between broadcast channel lists and out of band (OOB) control.

Figure 5:
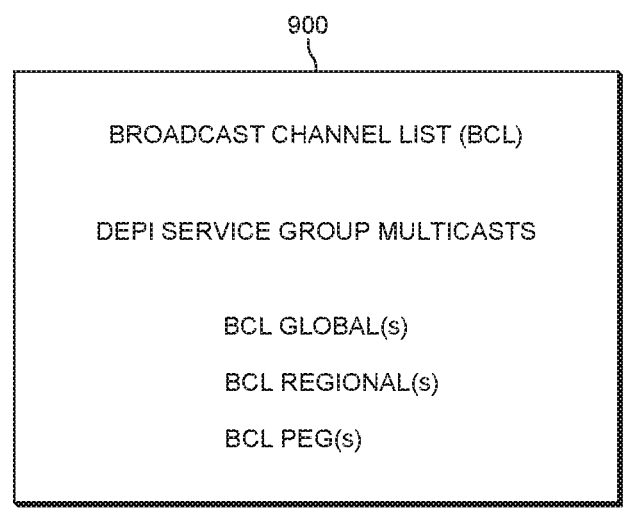
FIG. 5 illustrates a simplified broadcast channel list.

Referring to FIG. 5, a broadcast channel list 900 may be provided or otherwise created with sufficient information that allows the switched digital video protocols (e.g., R6 or RPC) to be used to create the MPTS streams in the absence of consumer premises equipment with the client tuning to those services. The broadcast channel list(s) 900 is a list of broadcast video services that remain part of the actively transmitted video services whether a subscriber tuner within the switched digital video (SDV) service group (customer premise equipment) is tuned to the service. The SDV Service Group is a set of QAM channels with actively managed switched services distributed to a group of subscribers defined by the node(s) or RF combiner physical distribution. In some cases, the SDV services may be combined with video on demand (VOD) services to manage both service types within the SDV service group. Depending on system architecture, these may include associations to Legacy Controller System Information with sufficient detail (e.g., frequency, modulation, program/service number, etc.) to align broadcast services MPTS under the control of a Switched Video System to the Service Information from the Legacy Controller. The Legacy Controller is the set-top box or customer premise equipment provisioning server, the conditional access system, or other system that creates the system information (i.e., SCTE-65 or DVB NIT and other related DVB tables defining the broadcast services on the network) for the customer premise equipment (CPE) (e.g., set top box). In some embodiments, the service related information may be locked to an existing channel map. In some embodiments (with an enabled client population), the service information is not locked to a channel map, however, the services may be maintained without client communications.

In one embodiment the system automatically creates broadcast linear QAMs (services always on) that align to channel map tuning triplets (frequency, modulation mode, program/service number). In this manner, the broadcast channel list may be automatically created or otherwise use the channel map. One advantage is that it does not require manual configurations on the edge QAM or on the MPTS (pre-DEPI wrapped). This allows for fewer maintenance windows for moving video around on the spectrum to make room for additional data services. No set-top box or digital television adapter client changes are necessary for this embodiment, but channel map changes may be configured at a digital addressable controller (or digital network control system or digital video broadcasting controller(s)).

Other embodiments may support switching the services without alignment to specific channel maps and edge QAM/DAA distributions. This may also require digital television adapter client changes and potentially set-top code from a channel map driven tune to process the mini-carousel to switched protocol for tuning. This evolution eases requirements on channel map configuration/operations. Other variants may provide for subscriber targeted advertising over QAM (e.g., within a Geographic Ad Zone).

Exemplary Session Control of Broadcast Services

In an exemplary embodiment, the starting anchor point for Switched System Broadcast MPTS creation on a given segment of a legacy video system is related to the service information distribution as reflected in the System Information. The system information may be, for example, SCTE-65 or DVB NIT or other related DVB tables defining the broadcast services on the network. Using the SCTE-65 standard as an example, the Carrier Definition Table frequencies are referenced in a Channel Map. The set of video service Source IDs identifying the same carrier definition table (CDT) Reference (which correlates to an electronics industries association (EIA) or a harmonically related coherent (HRC) channel frequency) comprise the set of services that will form the MPTS for that segment of the video network and that specific SCTE-65 (channel map) distribution. The various sets of MPTSs aimed at broadcast services will form the Broadcast Channel List. Services that are dynamically switched are also defined in the channel map, but typically have an EIA channel that might indicate it is not part of a defined MPTS (such as EIA-154 which corresponds to 999 MHz).

For example, the System Information may be pulled from the Consumer Premises Equipment Provisioning Server/Controlled Access Controller and is used to develop a Broadcast Channel List(s) (for example SCTE-65 channel map information with a designated carrier (from CDT) and associated source/service numbers (from a virtual channel table (VCT)) define each broadcast MPTS). Applicable PID insertion(s) may also be identified (discussed below).

For example, the services comprising the sets of MPTS's (including QAM frequency and Service Numbers) may form the broadcast channel list.

For example, the switched video system is provided the broadcast channel list(s) with sufficient detail to allow the R6 and/or RPC protocols to be used to build broadcast MPTS with existing equipment—specifically including definition of the frequency and service numbers (PIDs) on which the broadcast services will be carried that align to given channel maps.

For example, the switched video system may use R6 and/or RPC protocols to build broadcast MPTS using service number assignment and QAM frequency consistent with the system information/channel maps from the Consumer Premises Equipment Provisioning Server/Controlled Access Controller.

For example, the switched video system may insure the broadcast channel list of services remain "tuned" meaning the service number, frequency and QAM number are locked down and do not change regardless of whether any consumer premises equipment clients are tuned to the service (in contrast to a traditional switched digital video system where, if a dynamically switched service is not tuned, it is dropped from the multiplex(es)).

For example, PID Insertions (per QAM) may be handled with the existing equipment if there are messages/configurations available (outside of R6 and/or RPC switched protocols) or separately after a basic MPTS is formed or in conjunction with new broadcast channel list function(s). These may include EAS, DTA Control Stream, EBIF streams, DVB in-band, etc., in addition to the SDV in-band mini-carousel in a typical switched system.

For example, the mini-carousel may continue to provide only the dynamically switched service streams or provide both dynamically switched services and broadcast channel list.

For example, the broadcast channel list(s) may be further grouped and/or leveraged into "Broadcast Lineups" or "Broadcast Channel Sections" to insure MPTS with common distributions are identified together to enable simplified management across a distribution network that may or may not span distributed access architecture (groups may correlate to specific conditional access or regional footprints, ad-zone specific footprint, Public/Education/Government (PEG) boundaries, etc.).

For example, selected broadcast channel lists (e.g., PEGs) may be carried together within the traditional switched services as locked up bandwidth within those MPTS or SDV QAMs, thereby providing an advantage in distribution to nodes (RPDs).

For example, the Control streams can be identified as a separate OOB Broadcast stream so that the distribution to node or subscriber home can be managed together with the Broadcast Channel List(s). This OOB stream could be modulated (if necessary) in accordance with the system on which it is deployed (for example, SCTE-55-1 or SCTE-55-2 as is typical in North America). For in-band systems (for example, DVB), the information may be handled as part of the PID Insertion definitions.

Broadcast Channel List Management

Broadcast channel list(s) may be managed as mapped to either a logical switched group or a physical switched group (i.e., with the client switched managed services) tied to a specific narrowcast service group distribution. In either case, the services (QAM, modulation mode, service number) may be locked per the parameters defined as part of the broadcast channel list(s).

For logical: A subset of broadcast channels may be defined as global within a controlled access footprint. A subset of broadcast channels may be defined as regional within a controlled access footprint (e.g., ad-zone). These broadcast channel groups may be mapped to different QAMs or EIA channels (to either an edge QAM or to a distributed access architecture (DAA)/R-PHY architecture.

For physical: A subset of broadcast channels may be included with the physical narrowcast service group (e.g., PEG Channels (Public, Educational, and Government)). These services may be carried in the same service group(s) as actual client driven switched services.

Conditional Access Controller

This may be implemented by assuming the consumer premises equipment provisioning server is a conditional access controller or other system that acts as the source of the system information to the consumer premises equipment (e.g., SCTE65 channel maps or DVB NIT).

In this example, channel maps are delivered per the normal controller system provisioning process to the complement of consumer premises equipment (e.g., set-tops, digital terminal adapters (DTAs), cable cards, etc.).

In this example, a broadcast channel list(s) (BCL) may be defined with QAM frequencies and service numbers aligned to associated channel maps and applied to each narrowcast service group within a switched digital video (SDV) system.

In this example, the switched digital video (SDV) system may have a function that insures the broadcast channel list services are carried within the allocated narrowcast QAMs on the frequencies whether a consumer premises equipment device is actively tuned to the service.

In this example, consumer premises equipment devices may continue to use the channel map technique to tune to broadcast services and, if there are switched services (e.g., long tail content) present in the service offering, use the switched digital video technique to tune to switched services.

In this implementation, a digital television adapter (DTA) (one-way device that is dependent on channel map technique) may only tune services defined via the channel map. A set-top (or otherwise) with a switched digital video client would tune broadcast services via channel map technique and dynamically switched services via switched client technique (e.g., RPC or R6).

In this implementation, appropriate PID insertions may be implemented (Emergency Alert, DTA Control, mini-carousel for Dynamically Switched Services).

In this implementation, Public Education and Government channels and multiple Ad Zones that are used in one part of a plant (e.g., portion of a CMTS), but not in another may be managed by coordinating the channel map, broadcast channel list and dynamically switched services.

In this implementation, the Legacy Edge Device and/or DAA Video MPTS creation is accomplished through the R6 or RPC protocol. No changes to consumer premises equipment provisioning processes or consumer premises equipment functions are required.

Consumer Premises Equipment not Switched Digital Capable

In another implementation, the consumer premises equipment that is not switched digital video capable can be modified to read the mini-carousel. Once all consumer premises equipment is switched digital video capable, the frequencies and service numbers may be dynamic and not aligned to specific channel map definitions (although the broadcast channel list may still be in use to lock down/always carry the designated services). In this implementation, the switched digital video system may be required to carry both dynamically switched services (e.g., long tail content) and broadcast list services in the switched digital video mini-carousel. All consumer premises equipment may use the mini-carousel information to tune to the services. Separate channel maps may still be used to communicate the set of services available on a given section of plant.

With appropriate signalling techniques or appropriate information limiting techniques, this evolution of session control of broadcast services may simplify the detailed channel map management to managing a master list of services to the entire controller distribution.

To support this type of implementation, the broadcast channels list may have a technique to also limit or exclude services that are part of the conditional access controller or digital rights management system in use to specific narrowcast service groups. For example, this function can be used to manage public, education, and government channels or to manage multiple Ad Zones that may be required in one part of a plant, but not in another port of the plant. In this manner, either a master broadcast channel list (MBCL) and excluded channel list (ECL) may be used in conjunction with a technique to identify a channel map with a superset of channels identified to a set-top or other consumer premise equipment. The master broadcast channel list may be a list of broadcast services that are identified in the scope of a given conditional access controller or a digital rights management system. A service that is on the master broadcast channel list, but not on the given narrowcast broadcast channel list, may not be available to the narrowcast group for either broadcast or switched service. Depending on the implementation, this may or may not be required to manage the services available to a given narrowcast service group. The excluded channel list(s) may be a list of services that is identified within the scope of a general conditional access controller or digital rights management system. When identified with a narrowcast service group, these services may not be made available. Depending on the implementation, this may or may not be required to manage the services available to a given narrowcast service group.

Consumer Premises Equipment a Digital Television Adapter

A digital television adapter switch client (e.g., one-way client) the implementation may limit the user to only see channels in the channel map that are also carried on the mini-carousel. A switched digital video system may either create a separate digital television adapter mini-carousel that only includes the appropriate digital television adapter broadcast channels that are included in the broadcast channel list for that segment of plant or signal to the digital television adapter the specific digital television adapter broadcast channel list for that segment of plant. The channel map distributions may no longer be required from the controller.

Figure 6B:
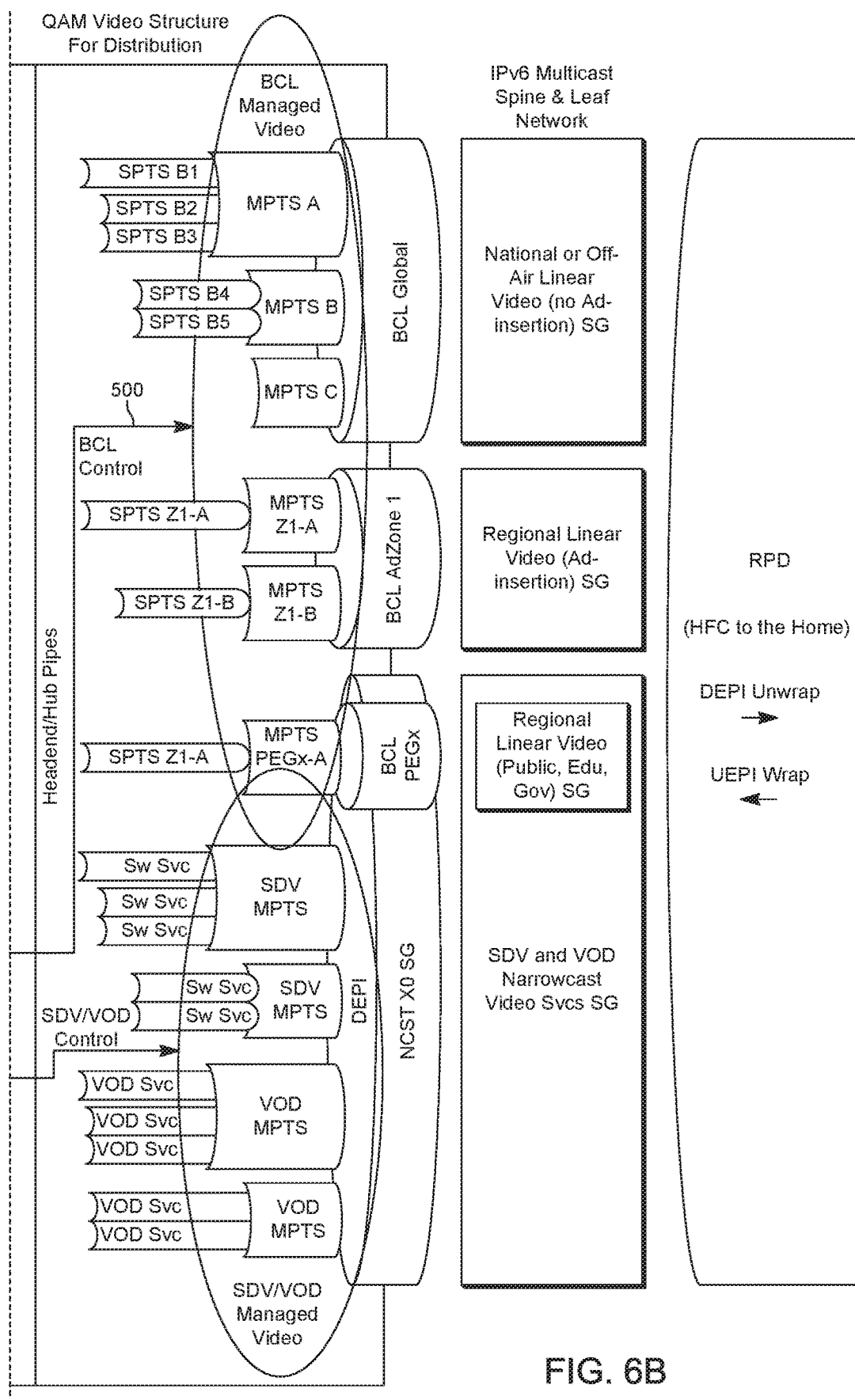
Figure 6C:
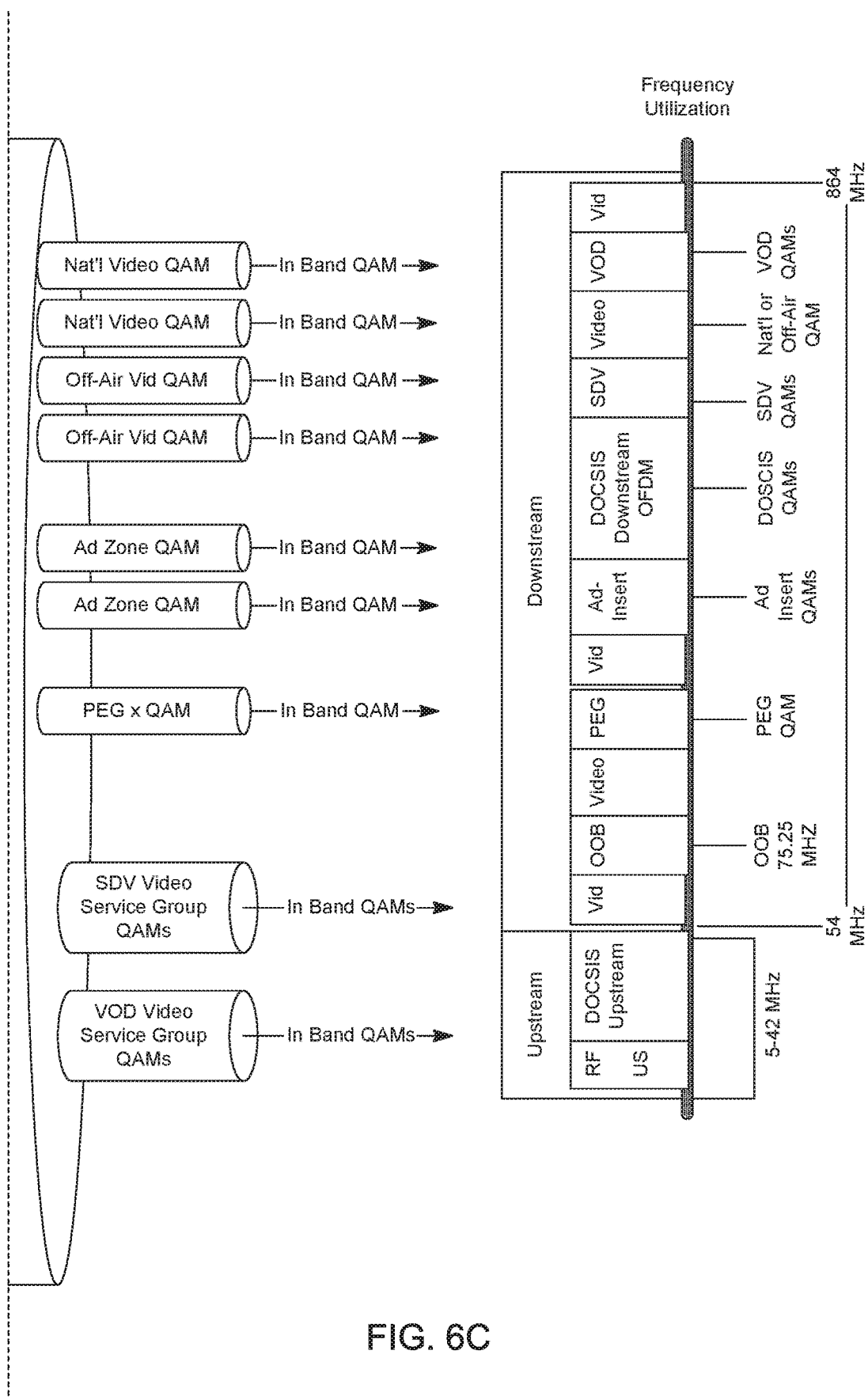

Referring to FIGS. 6A-6C, an exemplary representation of the tuning triplets (QAM Frequency, Modulation Mode, Service Number) for each service and where it may be placed on the frequency spectrum is illustrated. The lines 500 represent Broadcast Channel List Control of building up the Video MPTS that ultimately get realized as the Frequency Utilization on the right side. For Clarity, the Out of Band and Data Upstream and Downstream pieces in the Frequency Spectrum are not shown going through the RPD.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A cable system comprising:
   (a) at least one of a headend and a hub that includes a processor connected to at least one of (i) a plurality of quadrature amplitude modulators and (ii) through a transmission network that includes a plurality of remote fiber nodes, either of which converts digital data to analog data suitable for sending quadrature amplitude modulated video services to a plurality of quadrature amplitude demodulators in consumer premises devices suitable to receive said quadrature amplitude modulated video services;
   (b) said at least one of said headend and said hub configuring a headend configuration table defining broadcast linear video services for said quadrature amplitude modulated video services provided by said at least one of said headend and said hub to said plurality of quadrature amplitude modulators in at least one of said headend, said hub and said remote fiber nodes based upon a desired distribution of said broadcast linear video services, where all of said consumer premise devices receive the same said broadcast linear video services, where said at least one of said headend and said hub only configurable to provide said all of said consumer premise devices the same said broadcast linear video services;
   (c) wherein said configuring said headend configuration table for said broadcast linear video services is performed based upon data from a digital video configuration service that is independent of said broadcast linear video services;
   (d) wherein said configuring said headend configuration table for said broadcast linear video services is independent of tuning status of said consumer premises devices and wherein said configuring said headend configuration table for said broadcast linear video services is not based upon tuning parameters of said consumer premises devices.

2. The cable system of claim 1 wherein said headend configuration table relates to an alignment of channel maps of respective customer premises devices to said respective quadrature amplitude modulator(s).

3. The cable system of claim 1 wherein said digital video configuration service is a switched digital video.

4. The cable system of claim 1 further including video edge quadrature amplitude modulators.

5. The cable system of claim 4 further including video quadrature amplitude modulators.

6. The cable system of claim 1 further including each of said remote fiber nodes including a respective Remote Physical Device (RPD).

7. The cable system of claim 1 further comprising said remote fiber nodes including a respective RPD device configuration defining the configuration of said broadcast linear video services provided by said RPD device based upon said headend configuration table.

8. The cable system of claim 7 wherein each of said RPD devices includes a respective downstream external interface that receives said separate video service.

9. The cable system of claim 1 wherein each of said remote fiber nodes includes a remote device that includes medium access control and physical layers (RMD).

10. The cable system of claim 8 wherein said broadcast linear video services includes a multi-program transport stream video stream that is provided to groups of RPDs.

11. The cable system of claim 1 wherein data for said configuring of said headend configuration table is included within a switched digital video service.

12. The cable system of claim 11 wherein said data is included within a control protocol.

13. The cable system of claim 1 further comprising a broadcast linear channel list that is aligned to a channel map tuning triplets, wherein said tuning triplets includes at least (a) frequency, (b) modulation mode, and (c) program/service number, where said configurating said configuration table is based upon said broadcast linear channel list.

14. The cable system of claim 1 wherein system tuning information for said broadcast linear video services is delivered using Service Information Delivered Out-of-Band for Digital Cable Television (SCTE-65) protocols to said consumer premises devices.

15. The cable system of claim 1 wherein system tuning information for said broadcast linear video services is delivered using Digital Video Broadcasting (DVB) protocols to said consumer premises devices.

* * * * *